(12) United States Patent
Bengtsson et al.

(10) Patent No.: US 7,978,630 B2
(45) Date of Patent: Jul. 12, 2011

(54) METHOD AND SYSTEM OF MAINTAINING A CONNECTION IN A NETWORK COMMUNICATION SYSTEM

(75) Inventors: Henrik Bengtsson, Lund (SE); Olivier Moliner, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 170 days.

(21) Appl. No.: 12/433,088

(22) Filed: Apr. 30, 2009

(65) Prior Publication Data

US 2010/0278101 A1 Nov. 4, 2010

(51) Int. Cl.
*H04L 12/28* (2006.01)

(52) U.S. Cl. ...................................................... 370/254

(58) Field of Classification Search .................. 370/311, 370/254; 455/127.5, 574, 522
See application file for complete search history.

(56) References Cited

U.S. PATENT DOCUMENTS

| | | | |
|---|---|---|---|
| 6,212,175 | B1 | 4/2001 | Harsch |
| 7,088,698 | B1 | 8/2006 | Harsch |
| 2008/0002640 | A1 | 1/2008 | Westphal |
| 2008/0159163 | A1 | 7/2008 | Valli |
| 2008/0225865 | A1* | 9/2008 | Herzog .......................... 370/401 |
| 2008/0232288 | A1* | 9/2008 | Venkatachalam et al. .... 370/311 |

FOREIGN PATENT DOCUMENTS

WO    WO 2008/112396 A    9/2008

OTHER PUBLICATIONS

International Search Report, corresponding to PCT/IB2009/007015, mailed on Nov. 30, 2009.
Written Opinion, corresponding to PCT/IB2009/007015, mailed on Nov. 30, 2009.
Huawei: The decision to send NAT Keep-alive message; Jan. 9, 2007, 3GPP Draft; S2-070186 NAT-Keep__Alive, $3^{RD}$ Generation Partnership Project (3GPP), Mobile Competence Centre; 650, Route Des Lucioles; F-06921 Sophia-Antipolis Cedex; France, XP050258983 [retrieved on Jan. 9, 2007] the whole document.
Ericsson et al: "Pseudo-CR on NAT keep Alive Clarification" Oct. 13, 2008, 3GPP Draft; C1-084564 NAT Keepalive Clarification PA1, $3^{RD}$ Generation Partnership Project (3GPP), Mobile Competence Centre; 650, Route Des Lucioles; F-06921 Sophia-Antipolis Cedex; France, XP050309559 [retrieved on Oct. 13, 2008] the whole document.

* cited by examiner

*Primary Examiner* — Ayaz R Sheikh
*Assistant Examiner* — Blanche Wong
(74) *Attorney, Agent, or Firm* — Renner, Otto, Boisselle & Sklar, LLP (57) ABSTRACT

A method and system for maintaining a connection between two hosts in a multi-hop network comprising at least one network node disposed between the two hosts and a network element, e.g., a NAT, designed to release the connection after a period of inactivity. The method includes determining a first node in which a keep-alive message will terminate after crossing a network element designed to release the connection after a period of inactivity, and sending a keep-alive data packet configured to terminate in the first node after crossing the network element designed to release the connection. The keep-alive packet configured to terminate in the first node after crossing the network element designed to release the connection may be sent within a time period less than the time period of inactivity after which the network element would release the connection. The method allows for a connection to be kept open without waking up a client device and/or without activating air interface procedures.

12 Claims, 6 Drawing Sheets

METHOD AND SYSTEM OF MAINTAINING A CONNECTION IN A NETWORK COMMUNICATION SYSTEM

TECHNICAL FIELD OF THE INVENTION

The technology of the present disclosure relates, generally, to a method and arrangement to maintain an IP connection in a multi-hop network.

BACKGROUND

Most mobile services and applications are based on an architecture referred to as the client-server model. This system includes a server to service the requests of several smaller computers (e.g., mobile communication devices), which connect to the server and may be referred to as clients. The client devices typically do not communicate with each other but exchange data with the server. The server and the client establish a connection with each other, which typically passes through a plurality of routers (or nodes). Each node between the server and the client may also be referred to as a hop.

To ensure proper routing of the messages between the server and the intended mobile client, the messages are broken up into data packets, each of which receives a destination address according to a consistent protocol. The packets are reassembled upon being received by the intended or target client. The Internet Protocol (IP) is an acceptable protocol for exchanging information between a server and client. A Transmission Control Protocol (TCP) may be used in conjunction with the IP, and may provide for a reliable stream delivery of messages.

A TCP connection is designed to be maintained between two hosts in the multi-hop network for an arbitrary period of time and as long as the hosts are operational. It is not necessary that the TCP connection carries any traffic. With the growth of access networks (such as private or home networks), a network typically includes a NAT or NAPT (Network Address (Port) Translation) functionality. The NAT functionality is often implemented in a network access node (in home networks typically a wireless router) that serves the access network comprising a plurality of hosts (often terminals) connected to the access node. The access node is in turn connected to the core network (the Internet) through a network interface. Each host in the access network is allocated a unique private IP address. Normally, an Internet Service Provider (ISP) allocates only one public IP address per network interface. So, in order to allow more than one host in the access network to communicate towards the internet using only one public IP address, the Network Address Translation (NAT) functionality is necessary. The functionality of a NAT/NAPT is described, for example, in the Internet document RFC 3022.

The presence of NAT functionality in a network impacts the durability of established TCP connections. Many NATs are implemented with TCP binding timers for each established connection. A TCP binding timer is basically a timer that expires when no packets on a certain TCP connection have passed the NAT for a certain period of time. When the timer expires, the TCP connection is released by the NAT and needs to be re-established again if any new data packets have to be sent. The NATs have these binding timers due to physical limitations of the NAT. A NAT can only keep a finite number of connections in its memory. A common policy is therefore to release old and inactive connections. Some NATs can have other implementations to solve these physical limitations. One way is to have a finite priority list of established connections. As soon as a packet is sent on a certain connection, that connection is put on top of the priority list. When establishing a new connection through the NAT, the connection that was at the bottom of the priority list is released if there is no memory left to store bindings for the new connection.

This means that a TCP connection that is intended to be maintained between two hosts for a long time (for example a connection between a client and a presence server) simply is released by the NAT if no packets have been sent during a certain period of time.

One way to provide or maintain an "always-on" connection is to send keep-alive messages/packets (which may also be referred to as "heartbeat" messages) at a sufficiently high rate to keep the NAT open. Keep-alive messages are dummy TCP data packets. The packets are sufficient to reset the NAT binding time and keep the connection alive.

SUMMARY

According to one aspect of the invention, a method of keeping a connection open in a network is provided. In one embodiment, the method comprises a method for maintaining a connection between a first host and a second host in a multi-hop network having a network element configured to release the connection after a certain time period of inactivity, an air interface, and at least one node, where the method comprises determining the first node in which a keep-alive data packet will terminate after crossing the network element designed to release the connection after a certain time period of inactivity; and sending a keep-alive data packet from the first host toward the second host, wherein the keep-alive data packet is configured to terminate in the first network node after crossing the network element configured to release the connection.

In another embodiment, the method comprises determining the number of hops for required for a message to be sent from the first host to the second host and/or determining the time-out value of the network element designed to release the connection, and/or determining a time period ($T_{open}$) within which a keep-alive data packet must be sent such that the network element keeps the connection open.

In another embodiment, the network node configured to release the connection after a certain period of inactivity is disposed in the network in a position preceding the air interface with respect to messages sent from the first host toward the second host.

In another embodiment, the network element configured to release the connection is integrated with a node in the network.

In another embodiment, the node with which the network element configured to release the connection integrated therewith is disposed in the network in a position preceding the air interface with respect to messages sent from the first host toward the second host.

In another embodiment, the keep-alive data packet configured to terminate in the first network node after crossing the network element configured to release the connection terminates in the node having the network element integrated therewith.

In another embodiment, the step of sending the keep-alive packet configured to terminate in the network node after crossing the network element designed to release the connection after a certain period of inactivity is repeated at a time interval that is less than the time period of inactivity for which the connection would be released.

In another embodiment, determining the first node in which the keep-alive data packet will terminate after crossing the network element designed to release the connection after a period of inactivity comprises sending a first message to the second host, the first message having a time-to-live (TTL) value at least equal to the number of hops required to send a data packet from the first host to the second host; providing a keep-alive data packet having a decremented TTL value, the decremented TTL value being less than the number of hops (H) in the network; sending a message with the decremented TTL value toward the second host; sending a second message to the second host, the second message having a TTL value at least equal to the number of hops required to send a data packet from the first host to the second host; and determining if the second message reached the second host.

In another embodiment, the steps of providing a keep-alive data packet with a decremented TTL value, sending a message with the decremented TTL value, and sending a second message with a TTL value at least equal to the number of hops in the network is repeated if the first host determines that the second host received the second message.

In another embodiment, upon a determination that the second message sent to the second host did not reach the second host, the first host determines the TTL value ($TTL_{NAT}$) for the last message to cross the network element designed to release the connection after a period of inactivity; the second host reconnects to the first host, and the first host sends a keep-alive message data packet toward the second host having a TTL value of $TTL_{NAT}$, wherein the keep-alive packet having a TTL value of $TTL_{NAT}$ is sent at a time interval of T or less.

In another embodiment, the keep-alive message having a TTL value of $TTL_{NAT}$ crosses the network element designed to release the connection but does not cross the air interface.

In another embodiment, the first host is a server.

In another embodiment, the second host is a mobile client device.

In another embodiment, the connection is a TCP connection.

In another embodiment, the network element configured to release the connection after a certain period of inactivity is a network address translation functionality.

In another aspect, a host suitable for sending or receiving messages in a network is provided. In one embodiment, a first host comprises at least one processor; at least one transmitter device coupled to the processor, the transmitter operative to transmit and receive information between the first host and a second host upon a network connection being established between the first host and the second host; and the first host is operative to maintain a connection between the first host and a second host by determining a first node in the network in which a keep-alive data packet will terminate after crossing the network element designed to release the connection after a certain time period of inactivity; and sending a keep-alive data packet from the first host toward the second host, wherein the keep-alive data packet is configured to terminate in the network node after crossing the design network element designed to release the connection after a certain period of inactivity.

In another aspect, a communication system is provided. In one embodiment, the communication system comprises a first host with a connection to a second host; at least one node through which the connection between the first and the second host passes; and a network element designed to release the connection between the first and second host after a certain time period of inactivity; wherein the first host executes logic to (i) determine the first node in which a keep-alive data packet will terminate after crossing the network element designed to release the connection after a certain time period of inactivity, and (ii) send a keep-alive data packet from the first host toward the second host, wherein the keep-alive data packet is configured to terminate in the first network node after crossing the network element configured to release the connection.

In another embodiment, the network element configured to release the connection between the first and second host is disposed in a position preceding an air interface with respect to messages sent from the first host toward the second host.

In another embodiment, the network element designed to release the connection is integrated with a node in the network, and the node with which the network element is integrated is disposed in a position preceding an air interface with respect to messages sent from the first host toward the second host.

In another embodiment, the first host determines the first node in which a keep-alive data packet will terminate after crossing the network element designed to release the connection by executing logic to: send a first message to the second host, the first message having a time-to-live (TTL) value at least equal to the number of hops required to send a data packet from the first host to the second host; provide a keep-alive data packet having a decremented TTL value, the decremented TTL value being less than the number of hops (H) in the network; send a message with the decremented TTL value toward the second host; send a second message to the second host, the second message having a TTL value at least equal to the number of hops required to send a data packet from the first host to the second host; and determine if the second message reached the second host.

In another embodiment, upon a determination that the second message sent to the second host did not reach the second host, the first host determines the TTL value ($TTL_{NAT}$) for the last message to cross the network element designed to release the connection after a period of inactivity; the second host reconnects to the first host; and the first host sends a keep-alive message data packet toward the second host having a TTL value of $TTL_{NAT}$, wherein the keep-alive packet having a TTL value of $TTL_{NAT}$ is sent at a time interval less than the time period of inactivity for which the connection would be released.

In another embodiment, the first host may be a server, the second host may be a mobile device, the network element configured to release the connection may be a network address translator, and/or the connection may be a TCP connection.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Aspects of the present invention will now be described with reference to the drawings, wherein like reference numerals are used to refer to like elements throughout.

Figure 1:
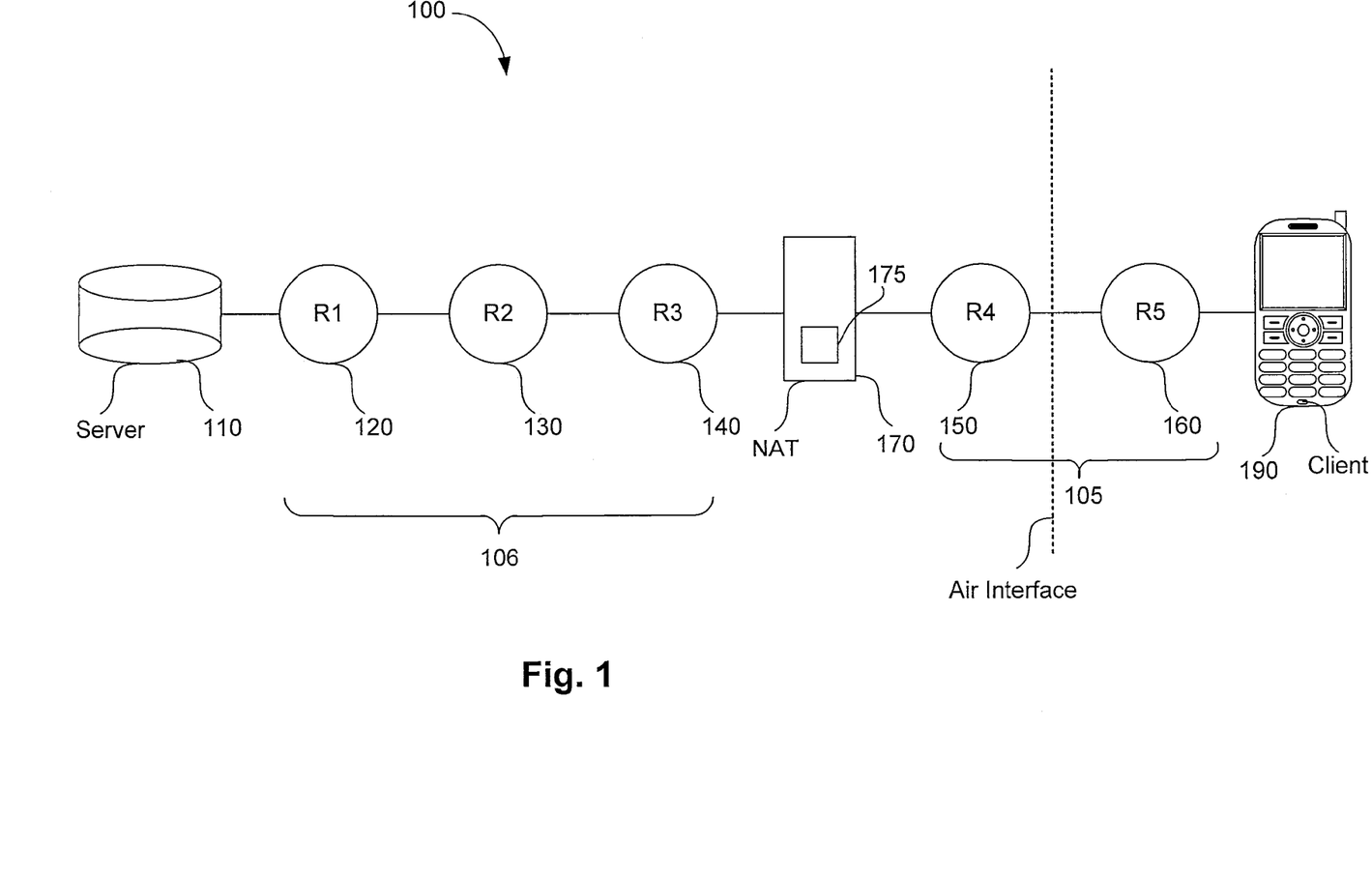
FIG. 1 is a schematic diagram illustrating a multi-hop network.

FIG. 1 illustrates an example of a multi-hop network communication system 100, in which a first host 110 (e.g., a server) may be connected to a second host 190 (e.g., a client (including a mobile client device)), through, for example, a TCP connection. The connection passes through a plurality of routers 120-160 (R1-R5, respectively) in the network. The client and the server are each provided with an IP address. The client is typically provided with a private IP address, and the server is provided with a public IP address. An internet service provider typically allocates a public address to the interface between networks (e.g., between an access network 105 and a core network 106) in the multi-hop network.

The hosts in the network are not particularly limited. In one embodiment, the first host may be a server. The first host may also be for example, a specifically adapted terminal where the connection is a peer-to-peer (P2P) connection. The first host may comprise at least one processor and at least one transmitter and optionally at least one receiver coupled to the processor. Transmitter and receiver devices may be configured to transmit and receive, respectively, protocol data units according to the Internet Protocol being employed in the network. Additionally, the transmitter and receiver may be configured to terminate an IP connection.

The second host may be any suitable device capable of sending messages to and receiving messages from another host (such as from a server). In one embodiment, the second host is an electronic device including, for example, portable radio communication equipment. The term "portable radio communication equipment" may also be referred to herein as a "mobile radio tenminal" or "mobile client" and may include equipment such as, for example, mobile telephones, pagers, communicators, i.e., electronic organizers, personal digital assistants (PDAs), smartphones, portable communication apparatus, and the like. The second host may include a processor and a transmitter and receiver coupled to the processor and be adapted to transmit and receive messages according to the Internet Protocol being employed in the network.

In order for a plurality of clients in an access network to share the public address of the interface, a network element 170 (e.g., a NAT) is provide between the networks 105 and 106. The NAT functionality 170 may be integrated in one of the network nodes as (e.g., the router R3, R4, or the like). For illustrative purposes the NAT 170 is shown in FIG. 1 as a separate entity. For each established connection, the NAT 170 has stored a binding. For each side of the NAT 170, the binding comprises a source IP address, a source port, a destination IP address and a destination port. The binding is stored in a binding table (not shown). As the NAT 170 cannot store bindings for an infinite number of connections, the NAT 170 is configured to release connections that not have been active for a certain period of time. This inactivity can be determined in different ways as mentioned above.

For example, each established connection may be assigned a connection binding timer 175 in the NAT 170. If the binding timer 175 is running, it will be restarted to its initial value which may be designated ($T_{bind}$) each time a packet passes the NAT 170. If no packet(s) arrive, the binding time ($T_{bind}$) will eventually expire. At expiry, the bindings for the corresponding connection are released by the NAT 170, and subsequent packets related to this connection that are received from the server 110 or the client 190, respectively, are ignored. Thus, the binding time ($T_{bind}$) may also be referred to as the time-out value ($T_{time-out}$) of the NAT since the connection will "time-out" or lapse if no packet arrives to reset the timer. Release of the connection has a significant negative effect on services that require TCP connections that need to be established for a long time and have relatively long idle times, as for example a connection between a client and a presence server.

As described above, the connection may be kept alive by sending keep-alive packets from the server 110 to the client 190. Keep-alive packets are normally retransmitted packets that have a sequence number set to the highest sequence number already sent in the connection. Keep-alive data packets include various fields. For example, a simplified structure of a keep-alive packet may include a header and an optional payload field. The header may include information fields including, for example, the destination address and the source address. The header may also include an information field called a time-to-live (TTL) field. The primary purpose of the TTL is to avoid messages or packets in the network from getting caught in an endless loop.

If keep-alive packets are sent through the NAT 170 at time intervals that are shorter than the value $T_{bind}$ (or $T_{time-out}$) of the binding timer 175, the binding timer 175 is restarted and the connection is maintained.

However, when the client 190 is a mobile terminal in a wireless access network, each received keep-alive packet that the mobile client receives "wakes up" the mobile terminal 190 if it is in idle mode. Waking up the idle terminal 190 causes an unnecessary drain of the mobile terminal's battery. Further, if the keep-alive packet is sent over the air interface 180, clients will be charged by their service provided.

In accordance with aspects of the present invention, a method is provided for keeping an IP (e.g., a TCP) connection open or alive without (i) waking up a client device and/or (ii) sending keep-alive messages across the air interface. The method provides a manner to keep a NAT connection open by sending keep-alive messages that cross the NAT but terminate in a node that precedes the air interface (provided the NAT is in the network in a position preceding the air interface).

As used herein, a keep-alive message may be considered as having "crossed the NAT" when the keep-alive message resets the binding timer in the NAT. As described above, the NAT may be integrated with a network node. Thus, in accordance with the present disclosure, a keep-alive message that terminates in a node into which the NAT has been incorporated and restarts the binding timer in the NAT is considered as "crossing the NAT". Additionally, as used herein, the phrase "first node after crossing the NAT" encompasses the node into which the NAT has been integrated. For example, while FIG. 1 shows the NAT 170 as not being integrated with a particular node, it will be appreciated that the NAT could be integrated with a node in the network such as, for example, router R3, router R4, etc. If the NAT is integrated with router R4, for example, a keep-alive message that terminates in router R4 and restarts the binding timer in the NAT will be considered as having crossed the NAT (and router R4 may be considered the first node after the NAT). Since router R4 is disposed before the air interface, a keep-alive message that reaches router R4 would keep the connection between the hosts open without waking up the second host (e.g., client 190) and without activating any air interface procedures.

Figure 2:
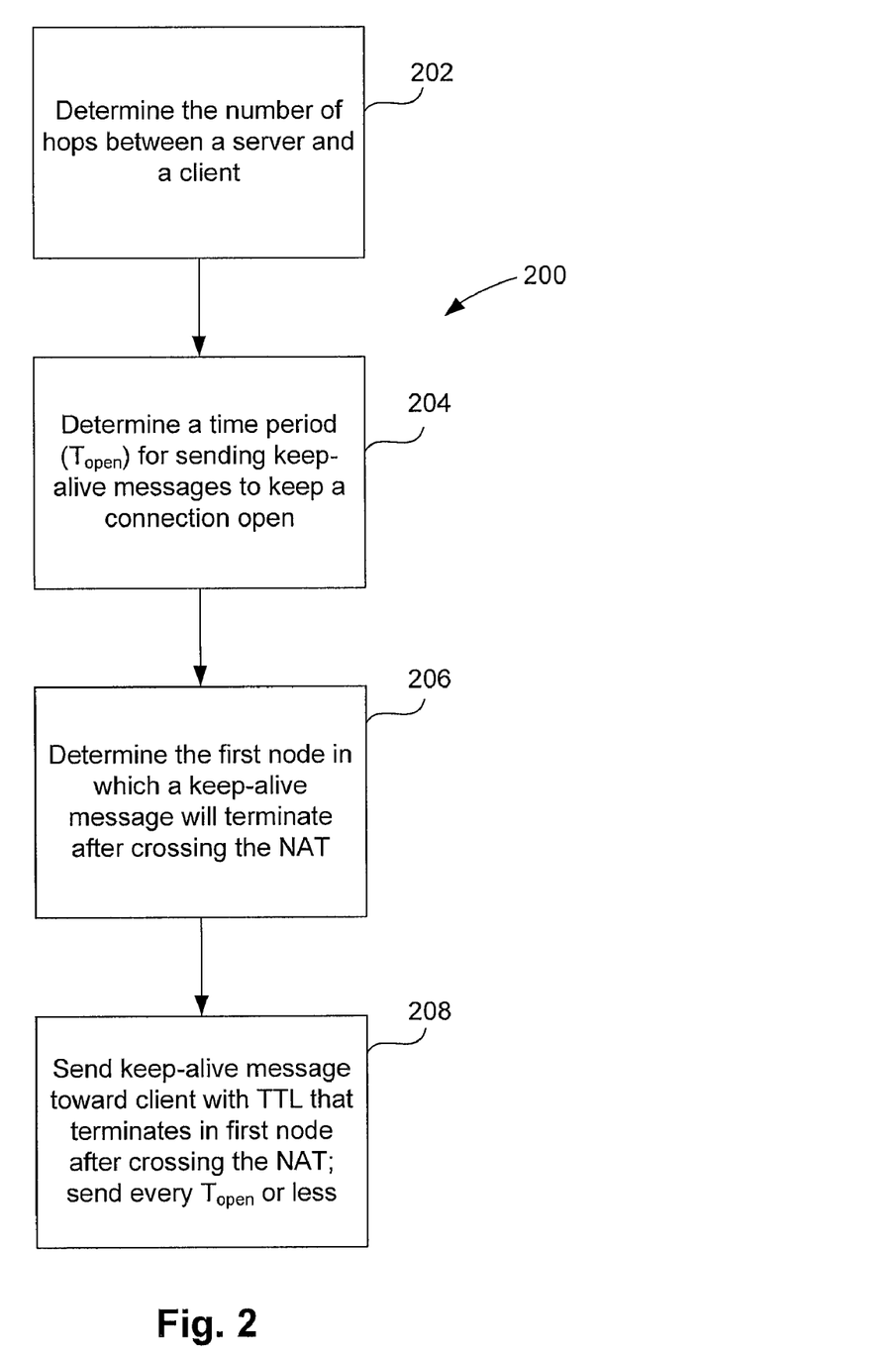
FIG. 2 is a schematic flow chart illustrating exemplary logic for keeping an IP connection open in accordance with aspects of the invention.

Referring to FIG. 2, a method 200 for keeping a connection open is shown. Generally, the method includes (i) determining the first node in which a keep-alive data packet will terminate after crossing the NAT, and (ii) sending a keep-alive data packet designed to terminate in the node. Keep-alive message designed to terminate in the first node after crossing the NAT should be sent at time intervals less than $T_{bind}$ (or $T_{time-out}$). In one embodiment the method 200, at functional block 202, a first host (e.g., a server) determines the number of hops between the first host and the second host. In particular, the first host determines the number of hops required for a message to reach the second host. At functional block 204, the server determines a time period ($T_{open}$) for which messages can be sent and still keep the connection open. This may be done by determining the time-out value ($T_{bind}$ or $T_{time-out}$) of the NAT. At functional block 206, the server determines the first node in which a keep-alive message terminates after crossing the NAT. As described above, this may be the node into which the NAT has been integrated. At functional block 208, the server sends a keep-alive message toward the client every time period $T_{open}$ or less where the keep-alive message has a TTL value such that the keep-alive message terminates in the first node after crossing the NAT (which, again, may be the network node integrating the NAT).

Figure 3:
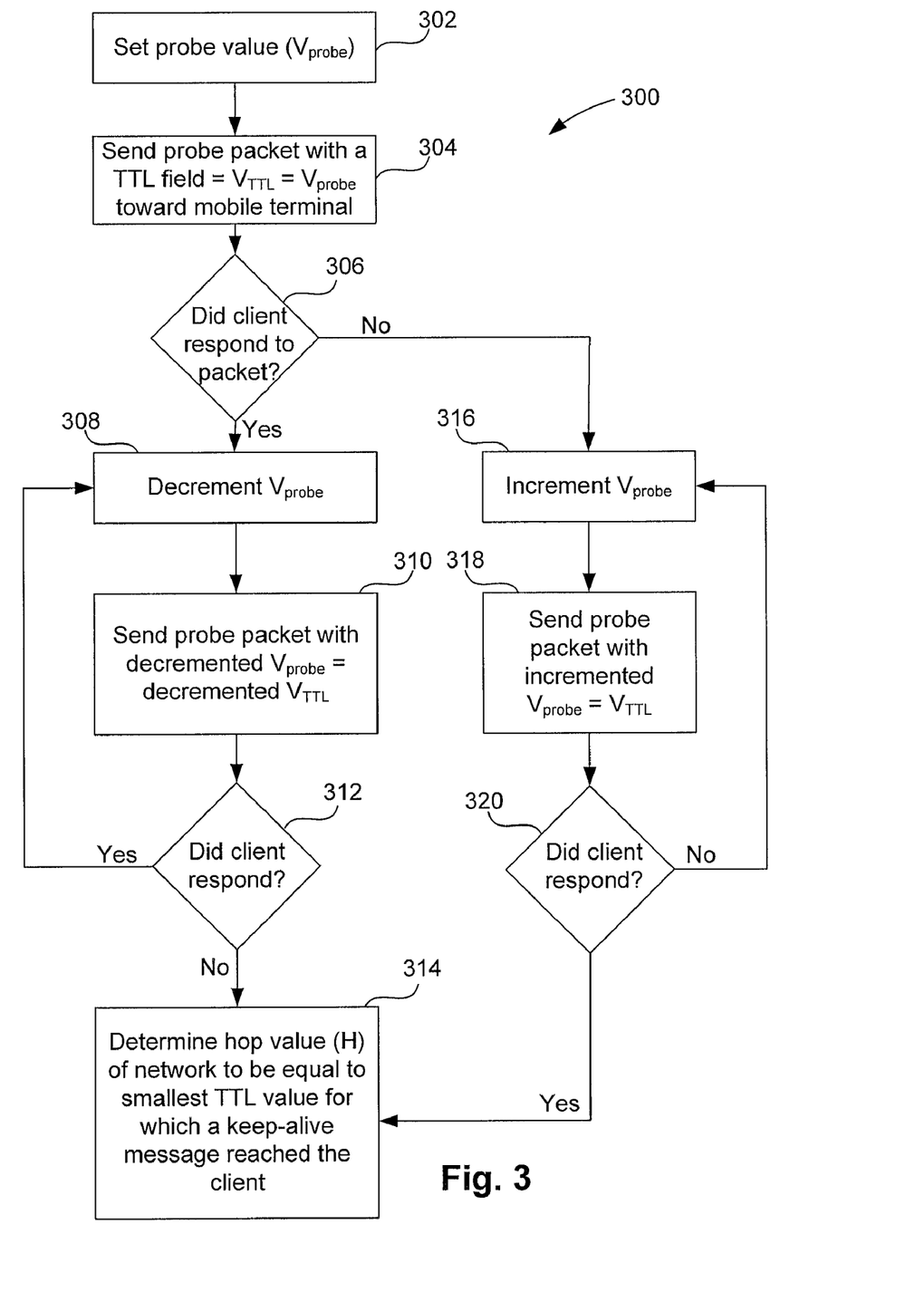
FIG. 3 is schematic flow chart illustrating exemplary logic for determining the number of hops in a multi-hop network.

The number of hops between the server and the client may be determined in any suitable manner. In one aspect, the TTL field in keep-alive messages may be used to determine the number of hops required for a message to reach the client. In particular, by sending keep-alive messages with different TTL values, the server may determine the number of hops between the server and the client. Keep-alive messages used for determining the number of hops in the network may be referred to as probe packets, and the TTL values of the probe packets may be referred to as probe values. Referring to FIG. 3, a method 300 for determining the number of hops (H) separating the server and the client is illustrated. For purposes of this illustration, the method will be discussed in terms of the connection between a server (as a first host) and a client (as a second host), such as a mobile terminal. At functional block 302, the probe packet is set with a probe value ($V_{probe}$) and the TTL field is set with a value ($V_{TTL}$) equal to the probe value ($V_{TTL}=V_{probe}$). At functional block 304, the server sends the probe packet toward the mobile terminal. At functional block 306, the server determines if the client has sent a response to the server indicating that the client received the probe packet. If the client sends a response, the hop value cannot yet be determined, and the process flows to functional block 308 where the probe value is decremented (e.g., ($V_{probe}=V_{TTL}-1$)). At functional block 310, the probe packet with the decremented probe value is sent toward the client. At functional block 312, the server again determines if the client has sent a response to the server. If the client sends a response, the process flows back to functional block 308, and the functions of functional blocks 308-312 are repeated until the client does not respond to the server.

When the probe value is decremented such that it does not reach the server, the last router receiving the packet (e.g., R5 in FIG. 1) will discard the packet and send a response to the server indicating that the TTL has been exceeded. At functional block 314, the server than determines that the hop value (H) for a message to reach the client in the network is equal to the smallest TTL value for which the server received a message from the client. In this example if the first TTL value for which the server receives a response that the TTL has been exceeded is designated $V_{TTL-exceeded}$, then the hop value of the network H is equal to $V_{TTL-exceeded}+1$.

Desirably, the initial probe value is selected to be a value equal to or greater than the number of hops required to reach the client. It will be appreciated, however, that the initial probe value may be chosen to be less than the number of hops required to reach the client. If the initial probe value is less than the number of hops required to reach the client, the probe packet will be discarded prior to reaching the client, and, at functional block 306, the client will not respond to the server. Rather, the router where the packet was discarded will send a message to the server indicating that the TTL value has been exceeded. In this case, the process can proceed to functional block 316, and the value of the probe can be incremented. A probe packet with the incremented probe/TTL value is then sent toward the client at functional block 318. At functional block 320, the server determines if it receives an acknowledgement from the client or a TTL exceeded packet from another router. If a TTL exceeded packet is received, the process loops back to functional block 316. If the server receives a response from the client, then the process flows to functional block 314, and the hop value is determined to be the smallest TTL value for which the server receives a response from the target.

The algorithm for determining the number of hops is not limited and may be selected as desired for a particular purpose. In one embodiment, the algorithm may decrement or increment the probe/TTL value by one each time the probe/TTL value must be adjusted. In another embodiment, a binary search algorithm may be used to adjust the probe/TTL value. It will be appreciated that other algorithms may be developed and implemented by a person skilled in the art to determine the number of hops in the network.

The connection to the NAT could be kept open simply by setting the TTL value of keep-alive messages to a value that is one less than the TTL value required to reach the client. While this would keep the NAT open without waking the client, it is still possible that the keep-alive message would cross the air interface, which results in the client being charged for keeping the connection open. For example, referring to FIG. 1, the network 100 is shown as having six hops for a packet to reach the client (hop 1=the hop from the server to router R1; hop 2=the hop from router R1 to router R2; hop 3=the hop from router R2 to router R3; hop 4=the hop from router R3 to router R4; hop 5=the hop from router R4 to router R5; and hop 6=the hop from router R5 to the client). If the server simply sets the TTL value of a keep-alive message to be equal to five, the keep-alive message would be discarded by router R5, but would still be transmitted across the air interface 180.

In one aspect, the method further includes determining a time period ($T_{open}$) for sending keep-alive messages to keep a connection open. In one embodiment, this may be the maximum time period within which keep-alive messages must be sent to keep a connection. $T_{open}$ will be a time period les than the time-out value ($T_{time-out}$) of the NAT. A method for determining $T_{open}$ may include determining the timeout value ($T_{time-out}$) of the NAT.

Figure 4:
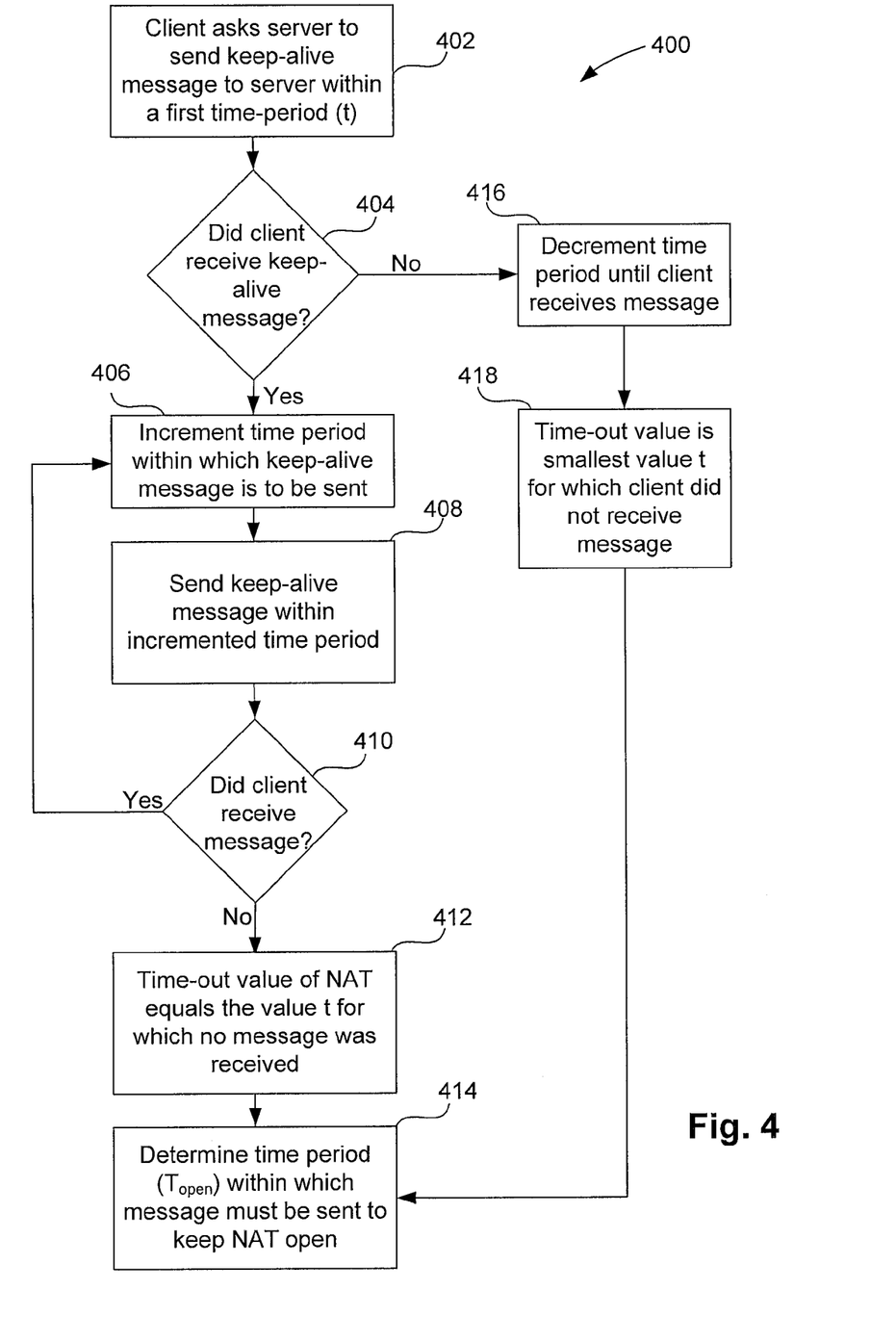
FIG. 4 is a schematic flow chart illustrating exemplary logic for determining the time-out value of a network address translation functionality (NAT) and/or a time period within which keep-alive messages must be sent to keep a connection open.

Referring to FIG. 4, a method 400 for determining the time-out value of the NAT and a value for $T_{open}$ is illustrated. At functional block 402, the client may connect to the server and ask the server to send the client a keep-alive message within a first time-period (t). At functional block 404, the server determines if the client received the message. If the keep-alive message arrives to the client within time t, then the time period t is less than the time-out value of the NAT and the process proceeds to functional block 406. At functional block 406, the client then asks the server to send the client another keep-alive message within an incremented time period (e.g., t'=t+n, where n=1, 2, 3, 4, ... etc.) relative to the previous time period t. At functional block 408, the server sends a message toward the client within the incremented time period. At functional block 410, the server determines if the client received the message. If the client receives the keep-alive message within the incremented time-period, the process loops back to functional block 406, and the client asks the server to send the client another keep-alive message within an incremented time period.

The functions of 406-410 are repeated until a keep-alive message sent from the server does not reach the client within the given time period. If at functional block 410, it is determined that the keep-alive message did not arrive within the incremented time period, then the keep-alive message did not arrive within a period of time to restart the binding timer in the NAT, and the connection will be closed. That is, the NAT has timed-out. The process proceeds to functional block 412, and the server determines that the time-out value ($T_{time-out}$) is equal to the value t for which no message was received. At functional block 414, the server determines that the time period within which keep-alive messages must be sent to keep the connection open ($T_{open}$) is less than the time-out value ($T_{time-out}$).

It will be appreciated that the initial time period that was requested may need to be decremented to determine the time-out value of NAT. For example, if it is determined at functional block 404 that the client did not receive the message, then the time period t exceed the time-out value of the NAT. In this case the value t would have to be decremented until it is determined that the message reaches the client (see functional block 416). The server would then be able to determine that the time-out value is the smallest value of t for which a message did not reach the client (functional block 418). The process then proceeds to functional block 414 and determines a value $T_{open}$ to keep the NAT open.

The server may set the value $T_{open}$ to any desired value such that $T_{open}$ is less than $T_{time-out}$. In one embodiment, for example, the server may set $T_{open}$ to the largest value of t employed in the process described with respect to FIG. 4 for which a message reached the client.

Figure 5:
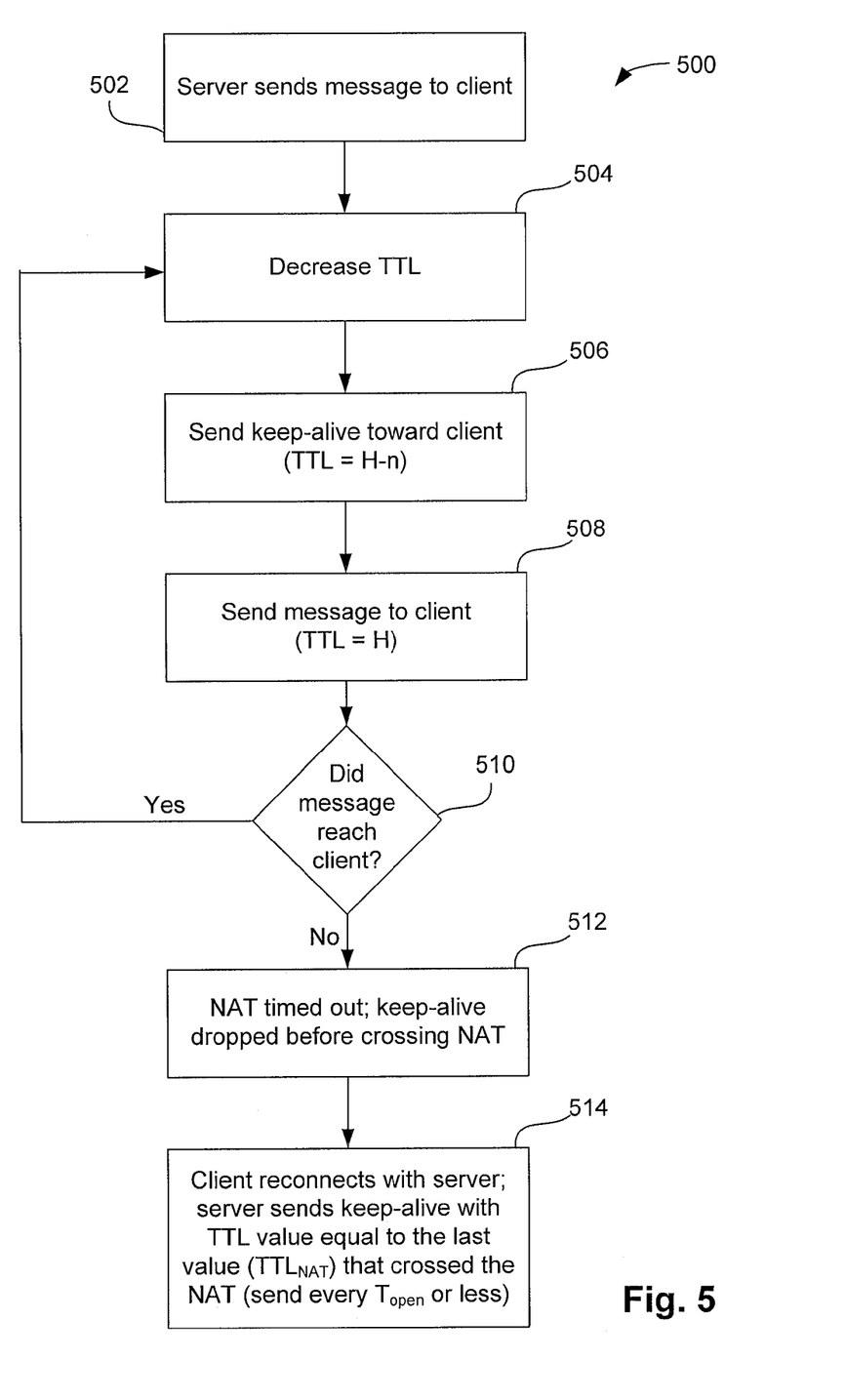
FIG. 5 is a schematic flow chart illustrating exemplary logic for determining the first node in a network in which a keep-alive message crosses the NAT.
Figure 6:
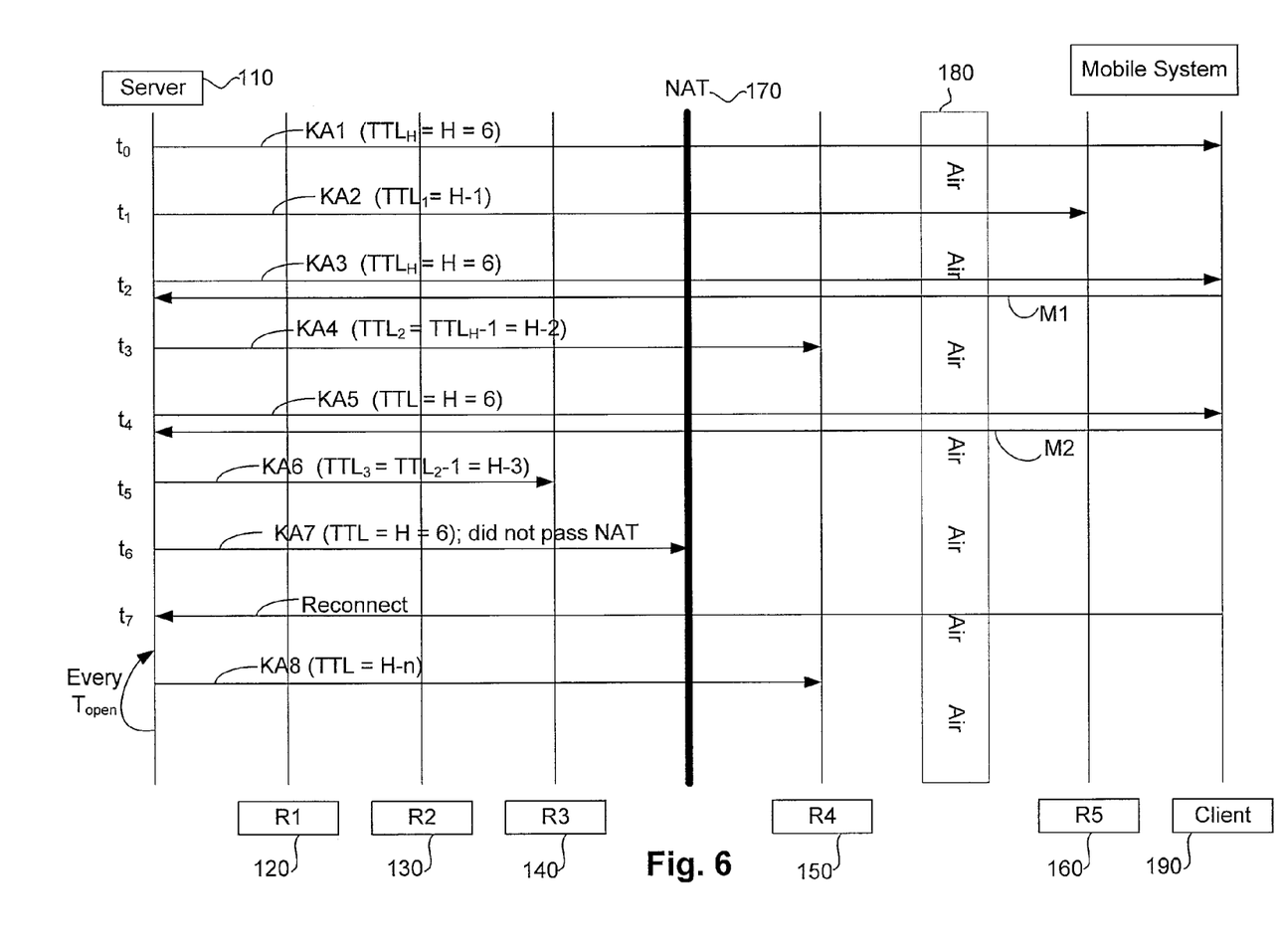
FIG. 6 is a schematic diagram illustrating the process described with respect to FIG. 5 for the multi-hop network of FIG. 1.

After determining the number of hops in the network and the time-out value of the NAT, the node in which a keep-alive message will terminate after crossing the NAT may be determined. FIGS. 5 and 6 illustrate aspects of a method 500 for determining the node in which a keep-alive message will terminate after crossing the NAT. At functional block 502 (FIG. 5), the server sends a message all the way to the client to establish that the connection is alive. At this point, the message is sent with a TTL value that is equal to or greater than the number of hops in the network, which may be determined as described above. In the network shown in FIG. 1, for example, the server would have determined that the network included six (6) hops and, at functional block 402, would send a message to the client with a TTL value of 6. Referring to FIG. 6, the function occurring at block 502 may be illustrated by the server 110 sending a keep-alive message KA1 having a TTL value of H=6 to the client 190.

At functional block 504, the server decrements the TTL by n units (H−n), and at functional block 506, the server sends the keep-alive message with the decremented TTL toward the client. Referring to the diagram in FIG. 6, this may be illustrated by the server 110 sending a keep-alive message KA2 having a TTL value of H−1, or 5, to the client. Since the TTL value is less than H, the keep-alive message KA2 will not reach the client. Thus, the keep-alive message KA2 would not "wake up" the client 190 and drain the battery of the client device. The server, however, does not know whether the keep-alive message KA2 will travel over the air interface. As shown in FIG. 6, the router R5 is positioned after the air interface. Thus, while the keep-alive message KA2 doesn't "wake up" the client, the message would still result in the activation of air interface procedures, and the client may be charged for such activity. In this step, the keep-alive message is sent at time $t_1$ such that $t_1$ is greater than 0 and less than the time-out value of the NAT.

At functional block 508 (FIG. 5), the server waits one time-out period for the NAT and sends a keep-alive message all the way to the client. So, referring again to FIG. 6, for example, the server sends a keep-alive message KA3 with a TTL value of H=6 to the client at time $t_2$. Time $t_2$ is greater than the time-out value of the NAT ($T_{time-out}$) but less than the value of ($t_1 + T_{time-out}$). More specifically, the time elapsed between time $t_2$ and time $t_0$ is greater than one time-out period for the NAT. But the message KA3 sent at time $t_2$ reaches the client because the message KA2 sent at time $t_1$ crosses the NAT (and keeps the connection open) and the time elapsed between the sending of message KA2 at time $t_1$ and the sending of message KA3 at time $t_2$ is less than a time-out period of the NAT (in the case less than $t_1 + T_{time-out}$).

At functional block 510, the server determines if the message sent at functional block 508 reached the client (e.g., by receipt of an acknowledgement message M1 (FIG. 6) from the client). If the message sent at time $t_2$ reaches the client, then the previous keep-alive message (e.g., the keep-alive message KA2 sent at time $t_1$ in FIG. 6) crossed the NAT and kept the connection open. If the server determines that the most recent keep-alive message kept the NAT open, the process proceeds back to functional block 504, and the functions at functional blocks 504-510 are repeated.

If, at functional block 510, the server determines that the message sent at functional block 508 does not reach the client, the process proceeds to functional block 512. This means that the message configured to be sent to the client (with TTL=H) was dropped before crossing the NAT. That is, the previous keep-alive message having a decremented TTL value did not cross the NAT, and the NAT timed out. Therefore, the smallest TTL value that was sufficient to keep the NAT open is the TTL value required to cross the NAT and restart the binding timer. And this value may also refer to the TTL value for which messages reach the first node beyond the NAT ($TTL_{NAT}$). At functional block 514, the client reconnects with the server and the server sends a keep-alive message toward the client with a TTL value of $TTL_{NAT}$. If the NAT is disposed before the air interface, determining the minimum TTL value to cross the NAT allows the server to provide keep-alive messages that terminate in the node into which the NAT has been integrated and, therefore, without crossing the air interface. Further, since the server has determined the time-out value of the NAT and a time period to keep the NAT open ($T_{open}$), the server will send the keep-alive message with the TTL value $TTL_{NAT}$ every time period $T_{open}$ (or less) to keep the NAT open. By doing this, the NAT may be kept open virtually forever without crossing the air interface. Therefore, the NAT is kept open essentially forever without draining the client device's battery (which would result with keep-alive messages that reach the client) and without the user incurring any costs associated with messages being sent across the air interface.

The method may be further understood by referring again to FIG. 6. If the server determines that the message KA3 sent at time $t_2$ reached the client (such as, for example, by receipt of an acknowledgement message M1 from the client), the server will provide another keep-alive message with a decremented TTL value, which is decremented relative to the last decremented keep-alive message sent. For example, using a simple algorithm, the TTL may be decremented by one unit such that $TTL_2=TTL_1-1=(H-1)-1=H-2=4$. At time $t_3$, the server sends the keep-alive message KA4 with a TTL value of $TTL_2=4$ toward the client, and the keep-alive message KA4 will reach the router R4. Time $t_3$ is greater than time $t_2$ but less than $t_1+T_{time-out}$. The server waits one time-out period, and then sends another message KA5 toward the client at time $t_4$. Time $t_4$ is greater than time $t_2+T_{time-out}$ but less than time $t_3+T_{time-out}$. Since the keep-alive message sent at time $t_3$ crossed the NAT, the connection was kept open, and the message sent at time $t_4$ reaches the client (as indicated by the client 190 sending an acknowledgement message M2 to the server 110). The time elapsed between time $t_2$ and time $t_4$ is greater than one time-out period for the NAT. The message KA5 sent at time $t_4$ reaches the client, however, because the message KA4 sent at time $t_3$ crosses the NAT, and the time elapsed between the sending of message KA4 and message KA5 is less than one time-out period for the NAT (in this case les than $t_3+T_{time-out}$).

Since the message sent at time $t_4$ reached the client device 190, the server 110 provides a keep-alive message with a decremented TTL value relative to the previous keep-alive message having a decremented TTL value (in this example, decremented relative to KA4). Thus, the server provides a keep-alive message KA6 with a TTL value of $TTL_3$, where $TTL_3$ is equal to $TTL_2-1=H-3=3$. At time $t_5$, the server sends the keep-alive message KA6 with a TTL value of 3 toward the client device. The server 110 again waits one time-out period and sends a keep-alive message KA7 with a TTL value of H (e.g., H=6 in the network depicted in FIGS. 1 and 6) toward the client at time $t_6$. As illustrated in FIG. 6, the keep-alive message sent at time $t_5$ had a TTL value of 3 and only reached the router R3, which is before the NAT. The keep-alive message KA6 does not cross the NAT and does not reset the binding timer. Consequently, the NAT connection times-out and closes or terminates. Therefore, the message KA7 sent at time $t_6$ also does not reach the client because the NAT has timed out and the connection has been closed.

From the process, the server knows the TTL value of the previous keep-alive message to cross or reach the NAT and keep the connection open. In the example described in FIG. 6, this occurred with keep-alive message KA4, which had a TTL value ($TTL_2$) of 4. This represents the minimum TTL value for which keep-alive messages will cross the NAT and reset the binding timer. Thus, in the example illustrated in FIG. 6, the server knows that a keep-alive message with a TTL value of 4 is required to cross the NAT. Further, as described above, having determined the time-out value ($T_{time-out}$) of the NAT, the server is able to determine a time interval ($T_{open}$) within which keep-alive messages can be sent before the NAT times out. Therefore, in the process depicted in FIG. 6, the server determines that a keep-alive message KA8 with a TTL value of 4 should be sent every $T_{open}$ time period (seconds, minutes, etc.) to keep the NAT open. And because the NAT and router R4 are positioned before the air interface, the process allows the NAT to be kept open without crossing the air interface.

Due to the mobility of the client device and/or the possible configuration change in the multi-hop network, the number of hops a data packet needs to make may change over time. If the number of hops increases, the connection will close during the process, and the process of determining the number of hops (H) in the network and the node in which a keep-alive message terminates upon crossing the NAT will begin again.

The processor in the first host may execute code and logic that implements the functionality for determining the first node in which a keep-alive message terminates upon crossing the NAT. It will be appreciated that a person having ordinary skill in the art of computer programming may determine how to program a host or device to carry out logical functions associated with this function. This may include functions to determine the number of hops in the network, the time-out value of the NAT, and/or the time period ($T_{open}$) within which messages must be sent to keep a connection open. Accordingly, details as to specific programming code have been left out for the sake of brevity. The functionalities could also be carried out by dedicated hardware, firmware, or a combination of hardware, firmware, and/or software.

The functionality may take the form of a computer program product, which can be embodied by a computer-usable or a computer-readable storage medium having computer-usable or computer-readable program instructions, "code" or a "computer program" embodied in the medium for use by or in connection with the processor. A computer-usable or computer readable medium may be any medium that can contain, store, communicate, propagate, or transport the program for use by or in connection with the processor, apparatus, or device. The computer-usable or computer-readable medium may be, for example, an electronic, magnetic, optical, electromagnetic, infrared, or semiconductor system, apparatus, device, or propagation medium.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method for maintaining a connection between a first host and a second host in a multi-hop network having a network element configured to release the connection after a certain time period of inactivity, an air interface, and at least one node, wherein the network element and the at least one node are disposed between the first host and the second host and the air interface is disposed between the network element and the second host, the method comprising:
   determining a first node in which a keep-alive data packet will terminate after crossing the network element configured to release the connection after a certain time period of inactivity; and
   sending a keep-alive data packet from the first host toward the second host, wherein the keep-alive data packet is configured to terminate in the first node after crossing the network element configured to release the connection,
   wherein the step of determining the first node in which the keep-alive data packet will terminate after crossing the network element configured to release the connection after a period of inactivity comprises:

sending a first message to the second host, the first
message having a time-to-live (TTL) value at least
equal to the number of hops required to send a data
packet from the first host to the second host;
providing a keep-alive data packet having a decremented
TTL value, the decremented TTL value being less
than the number of hops (H) in the network;
sending a message with the decremented TTL value
toward the second host;
sending a second message to the second host, the second
message having a TTL value at least equal to the
number of hops required to send a data packet from
the first host to the second host; and
determining if the second message reached the second
host,
wherein upon a determination that the second message sent
to the second host did not reach the second host, the first
host determines the TTL value ($TTL_{NAT}$) for the last
message to cross the network element configured to
release the connection after a period of inactivity; the
second host reconnects to the first host, and the first host
sends a keep-alive data packet toward the second host
having a TTL value of $TTL_{NAT}$, wherein the keep-alive
data packet having a TTL value of $TTL_{NAT}$ is sent at a
time interval that is less than the time period of inactivity
for which the connection would be released, and
wherein the keep-alive data packet having a TTL value
of $TTL_{NAT}$ crosses the network element configured to
release the connection but does not cross the air interface.

2. The method of claim 1, wherein the network element configured to release the connection is integrated with a node in the network.

3. The method of claim 2, wherein the keep-alive data packet configured to terminate in the first node after crossing the network element configured to release the connection terminates in the node having the network element integrated therewith.

4. The method of claim 1, wherein the step of sending the keep-alive packet configured to terminate in the node after crossing the network element configured to release the connection after a certain period of inactivity is repeated at a time interval that is less than the time period of inactivity for which the connection would be released.

5. The method of claim 1, wherein the steps of providing a keep-alive data packet with a decremented TTL value, sending a message with the decremented TTL value, and sending a second message with a TTL value at least equal to the number of hops in the network is repeated if the first host determines that the second host received the second message.

6. The method of claim 1, wherein the first host is a server.

7. The method of claim 1, wherein the second host is a mobile client device.

8. The method of claim 1, wherein the connection is a TCP connection.

9. The method of claim 1, wherein the network element configured to release the connection after a certain period of inactivity is a network address translator.

10. A first host comprising:
at least one processor;
at least one transmitter device coupled to the processor, the transmitter operative to transmit and receive information between the first host and a second host upon a network connection being established between the first host and the second host, the network including the first host, the second host, a network element configured to release the connection after a certain time period of inactivity and at least one node, and an air interface, wherein the network element and the at least one node are disposed between the first host and the second host and the air interface is disposed between the network element and the second host; and
the first host is operative to maintain a connection between the first host and the second host by executing logic to:
determine a first node in the network in which a keep-alive data packet will terminate after crossing the network element configured to release the connection after a certain time period of inactivity; and
send a keep-alive data packet from the first host toward the second host, wherein the keep-alive data packet is configured to terminate in the node after crossing the network element configured to release the connection after a certain period of inactivity,
wherein the first host determines the first node in which a keep-alive data packet will terminate after crossing the network element configured to release the connection by executing logic to:
send a first message to the second host, the first message having a time-to-live (TTL) value at least equal to the number of hops required to send a data packet from the first host to the second host;
provide a keep-alive data packet having a decremented TTL value, the decremented TTL value being less than the number of hops (H) in the network;
send a message with the decremented TTL value toward the second host;
send a second message to the second host, the second message having a TTL value at least equal to the number of hops required to send a data packet from the first host to the second host; and
determine if the second message reached the second host,
wherein, upon a determination that the second message sent to the second host did not reach the second host the first host determines the TTL value ($TTL_{NAT}$) for the last message to cross the network element configured to release the connection after a period of inactivity; the second host reconnects to the first host, and the first host sends a keep-alive data packet toward the second host having a TTL value of $TTL_{NAT}$, wherein the keep-alive packet having TTL value of $TTL_{NAT}$ is sent at a time interval less than the time period of inactivity for which the connection would be released, and wherein the keep-alive data packet having a TTL value of $TTL_{NAT}$ crosses the network element configured to release the connection but does not cross the air interface.

11. A communication system comprising:
a first host with a connection to a second host;
at least one node through which the connection between the first and the second host passes;
a network element configured to release the connection between the first and second host after a certain time period of inactivity, the network element disposed between the first host and the second host; and
an air interface disposed between the network element and the second host;
wherein the first host executes logic to (i) determine a first node in which a keep-alive data packet will terminate after crossing the network element configured to release the connection after a certain time period of inactivity, and (ii) send a keep-alive data packet from the first host toward the second host, wherein the keep-alive data packet is configured to terminate in the first node after crossing the network element configured to release the connection, wherein the first host determines the first node in which a keep-alive data packet will terminate after crossing the network element configured to release the connection by executing logic to:

send a first message to the second host, the first message having a time-to-live (TTL) value at least equal to the number of hops required to send a data packet from the first host to the second host;

provide a keep-alive data packet having a decremented TTL value, the decremented TTL value being less than the number of hops (H) in the network;

send a message with the decremented TTL value toward the second host;

send a second message to the second host, the second message having a TTL value at least equal to the number of hops required to send a data packet from the first host to the second host; and determine if the second message reached the second host, wherein, upon a determination that the second message sent to the second host did not reach the second host the first host determines the TTL value ($TTL_{NAT}$) for the last message to cross the network element configured to release the connection after a period of inactivity; the second host reconnects to the first host, and the first host sends a keep-alive data packet toward the second host having a TTL value of $TTL_{NAT}$, wherein the keep-alive packet having TTL value of $TTL_{NAT}$ is sent at a time interval less than the time period of inactivity for which the connection would be released, and wherein the keep-alive data packet having a TTL value of $TTL_{NAT}$ crosses the network element configured to release the connection but does not cross the air interface.

12. The communication system of claim 11, wherein the network element configured to release the connection is integrated with a node in the network, and the node with which the network element is integrated is disposed in a position preceding an air interface with respect to messages sent from the first host toward the second host.

* * * * *